US007059243B1

(12) United States Patent
Gatta

(10) Patent No.: US 7,059,243 B1
(45) Date of Patent: Jun. 13, 2006

(54) POSITIVE PIECE ENGAGEMENT INDICATOR FOR MARKING TOOL

(76) Inventor: Raymond P. Gatta, 435 Gentry Dr., Aurora, OH (US) 44202

( * ) Notice: Subject to any disclaimer, the term of this patent is extended or adjusted under 35 U.S.C. 154(b) by 77 days.

(21) Appl. No.: 10/688,735

(22) Filed: Oct. 20, 2003

Related U.S. Application Data

(62) Division of application No. 09/790,158, filed on Feb. 21, 2001, now Pat. No. 6,719,465.

(51) Int. Cl.
*B23Q 11/00* (2006.01)

(52) U.S. Cl. ............................ 101/3.1; 101/19; 83/62; 83/63; 83/74

(58) Field of Classification Search ............ 400/134.2, 400/134.5, 124.01, 124.02, 124.04, 124.05, 400/124.14, 127; 101/3.1, 19, 26, 32; 83/62, 83/62.1, 63, 72, 74
See application file for complete search history.

(56) References Cited

U.S. PATENT DOCUMENTS 3,645,156 A * 2/1972 Meyer et al. ................ 83/862
3,747,142 A * 7/1973 Arbogast et al. ............ 470/45
4,391,358 A * 7/1983 Haeger ...................... 192/130
6,698,323 B1 * 3/2004 Formon et al. ............... 83/62
6,719,468 B1 * 4/2004 Gatta ................... 400/124.01

* cited by examiner

*Primary Examiner*—Andrew H. Hirshfeld
*Assistant Examiner*—Kevin Williams
(74) *Attorney, Agent, or Firm*—John D. Gugliotta

(57) ABSTRACT

A positive piece engagement indicator for marking tool is provided in which a metal workpiece is contacted with a workpiece contact probe for providing physical contact with, as well as electrical communication with the metal surface of a workpiece. A test voltage and indicator means are placed in series between the workpiece and marking tool. Upon physical contact of the marking tool engagement surface with the surface of the metal workpiece, a circuit is completed by the electrical communication there between, thereby engaging the indicator means. This allows positive verification of actual engagement of worktool to workpiece.

4 Claims, 4 Drawing Sheets

POSITIVE PIECE ENGAGEMENT INDICATOR FOR MARKING TOOL

RELATED APPLICATIONS

The present invention is a Divisional Application of U.S. Ser. No. 09/790,158 filed on Feb. 21, 2001 now U.S. Pat. No. 6,719,465.

BACKGROUND OF THE INVENTION

1. Field of the Invention

The present invention relates generally to assembly line piece marking tools and, more particularly, to a positive piece engagement indicator for marking tool.

2. Description of the Related Art

Current regulation require that various component assemblies that comprise a motor vehicle be scribed with a unique, identifying indicia that can allow the manufacturer or law enforcement to compare or trace the source of such component assemblies. With the current state of automation on vehicle assembly lines, such marking or scribing is also currently done, generally, in an automated fashion. For example, as a vehicle frame assembly is fabricated and conveyed down an assembly line for insertion of drive train or attachment of body or cabin components, a marking tool will scribe, etch, or stamp a unique vehicle identification number at a specific location on the frame. This number will correspond with a similar number scribed, etched, or stamped on the engine components as well as the body or cabin components.

In the related art, two general types of marking tools are generally commercially available and used for this process. These can be broadly classified as impact type marking tools, and etch type scribing tools.

Impact type marking tools generally operate by driving an impact pin into a collision with the metal workpiece, thereby leaving an impression. Although multiple impact pins, each having a striking surface shaped like a different letter or number can be used, the most common of these types of impact marking devices utilizes either a single pin that can move within a grid of positions, or an array of such pins. By leaving a series of aligned impressions, characters can be formed by this series of "dots". Examples of such a system currently commercially available include the Telesis Controls Corporation pin matrix embossing apparatus described in U.S. Pat. No. 4,506,999.

Etch type scribing devices perform an equivalent function operating on a different principle. By guiding a scribing tip or cutting blade, a character is gouged or etched into the surface of the metal. Examples of such a system includes the BORRIES™ scriber marking system, that provides a constant, pressurized impact and relative motion between tool tip and work surface. This is generally known as a scriber type marking device. An alternate type of etching device is known that can be considered a cross between impact printer and scriber, providing a pressurized impact and relative motion between a vibrating or reciprocating stylus and a work surface. Examples of such a system include the Micro-Percussion Marking Device as supplied by TEKNIFOR™.

Common to both types of method are the use of a metal tipped marking implement contacted and penetrating a metal part surface.

Problems currently exist in the use of any currently, commercially available system that generally involve verification of the stamping or scribing process. The main problem using either type of system is the result of inadequate piece engagement relative to the marking device. In use of the impact type marking tools, should the impact pin fail to be properly aligned, or otherwise fail to properly collide and penetrate the surface of the metal workpiece, an inadequate impression is left, or possibly no impression at all. Similarly, in the use of scribe type marking systems, should the scribing tip or cutting blade fail to contact the surface to be marked continuously through the etching process, the same deficient results occur.

Sundry reasons may exist that result in such errors. Movement of the assembly line, placement of the piece on the assembly line, movement of the marking tool, rotational misalignment of the piece or marking tool, or any condition that can result in inadequate placement of the marking tool relative to the piece to be marked will cause the same overall result. Attempts to correct for the foregoing problems have been few and limited. Currently, outside manual inspection, the only available system to verify or check the marking process in an automatable manner has been the of computerized vision system technology to visibly inspect the marked reference characters after scribing or impacting. Because, by necessity, each reference indica is inherently unique overall, such vision systems are complex, unreliable, and very expensive to install and operate.

A search of the prior art did not disclose any patents that read directly on the claims of the instant invention; however, the following references were considered related.

U.S. Pat. No. 4,883,291 issued in the name of Robertson discloses dot matrix formed security fonts.

U.S. Pat. No. 5,893,668 issued in the name of Harrison et al., discloses a method for optimizing font marking.

U.S. Pat. No. 5,319,352 issued in the name of Robertson et al. discloses a speed monitoring of in-plant, operator controlled vehicles.

U.S. Pat. No. 5,316,397 issued in the name of Robertson et al. describes a marking apparatus with multiple marking modes.

The following two patents, both assigned to Rockwell, appear to be directed at position detection, albeit for rotary based motion control:

- U.S. Pat. No. 5,712,574 issued in the name of Street discloses an apparatus for position detection and verification thereof using pulse patterns having sequentially unique properties.
- U.S. Pat. No. 5,350,955 issued in the name of Street discloses an apparatus for position detection and verification thereof using pulse patterns having sequentially unique properties.

Additional patents have been provide in order to indicate the general nature and direction such "detection" systems have taken in other ancillary arts:

- U.S. Pat. No. 5,393,967 issued in the name of Rice et al. discloses a method and apparatus for non-contact reading of a relief pattern.
- U.S. Pat. No. 5,397,872 issued in the name of Baker et al. discloses a weld monitor system.
- U.S. Pat. No. 5,231,675 issued in the name of Sarr et al. discloses a sheet metal inspection system and apparatus.

Consequently, a need has been felt for providing an apparatus and method which allows for verification of contact between impact or scribing tool and the work surface to be marked or scribed.

SUMMARY OF THE INVENTION

It is therefore an object of the present invention to provide an improved verification of physical engagement between a marking tool and a metal workpiece.

It is yet another object of the present invention to prove a positive piece engagement indicator for marking tool for use in stamping verification.

It is a feature of the present invention to provide an improved positive piece engagement indicator for marking tool that ascertains physical contact is made between marking tool and a metal workpiece by verification of electrical continuity between the component and tool through an analysis circuit formed for just that purpose.

Briefly described according to the broad embodiment of the present invention, a positive piece engagement indicator for marking tool is described in which a metal workpiece is contacted with a workpiece contact probe for providing physical contact with, as well as electrical communication with the metal surface of a workpiece. A marking tool is provided that is contacted with a marking tool contact for providing physical contact with the marking tool, as well as electrical communication with the engagement surface of the marking tool. A test voltage and indicator means are placed in series between the workpiece and marking tool. Upon physical contact of the marking tool engagement surface with the surface of the metal workpiece, a circuit is completed by the electrical communication there between, thereby engaging the indicator means. This allows positive verification of actual engagement of worktool to workpiece.

In accordance with a preferred embodiment, a pin stamping pin impact marking tool is utilized as a means to imprint identifying indicia within a metal piece. The pin stamping pin impact marking tool includes an impact pin thrusted into the work surface by a pin driver. The test voltage is in electrical communication with the impact pin itself, and the indicator means includes a latching relay to hold the continuity signal when engaged. Due to the speed at which the impact pin is thrusted and returned, actual physical engagement with the metal work surface occurs only for a limited time. Therefore, a latching relay capable of sensing continuity for a short time duration is used to engage an indicator circuit or computer monitoring system to allow for automation based upon the verification of the presence or absence of tool to piece engagement during the printing cycle.

Another preferred embodiment of the present invention, a scriber type marking tool is utilized as a means to etch an identifying indicia within a metal piece. The test voltage is in electrical communication with the scribing surface through electrical contact with the scribing blade, and actual physical engagement with the metal work surface can be monitored throughout the scribing cycle. Similarly, an indicator circuit or computer monitoring systems inputting of this engagement indication allows for automation based upon the verification of the presence or absence of tool to piece engagement during the scribing cycle.

An advantage of the present invention is that is provides verification of actual engagement between the piece to be marked and the marking tool.

Another advantage of the present invention is that it provides verification of actual engagement between the piece to be marked and the marking tool in a manner adaptable to either impact type or scribe type marking systems.

Yet another advantage of the present invention is that it provides a low-cost system for verifying actual engagement between the piece to be marked and the marking tool.

Still another advantage of the present invention it is adaptable to providing verification of actual engagement between where the use of any metal-tipped implement is to be contacted with a metal part surface.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
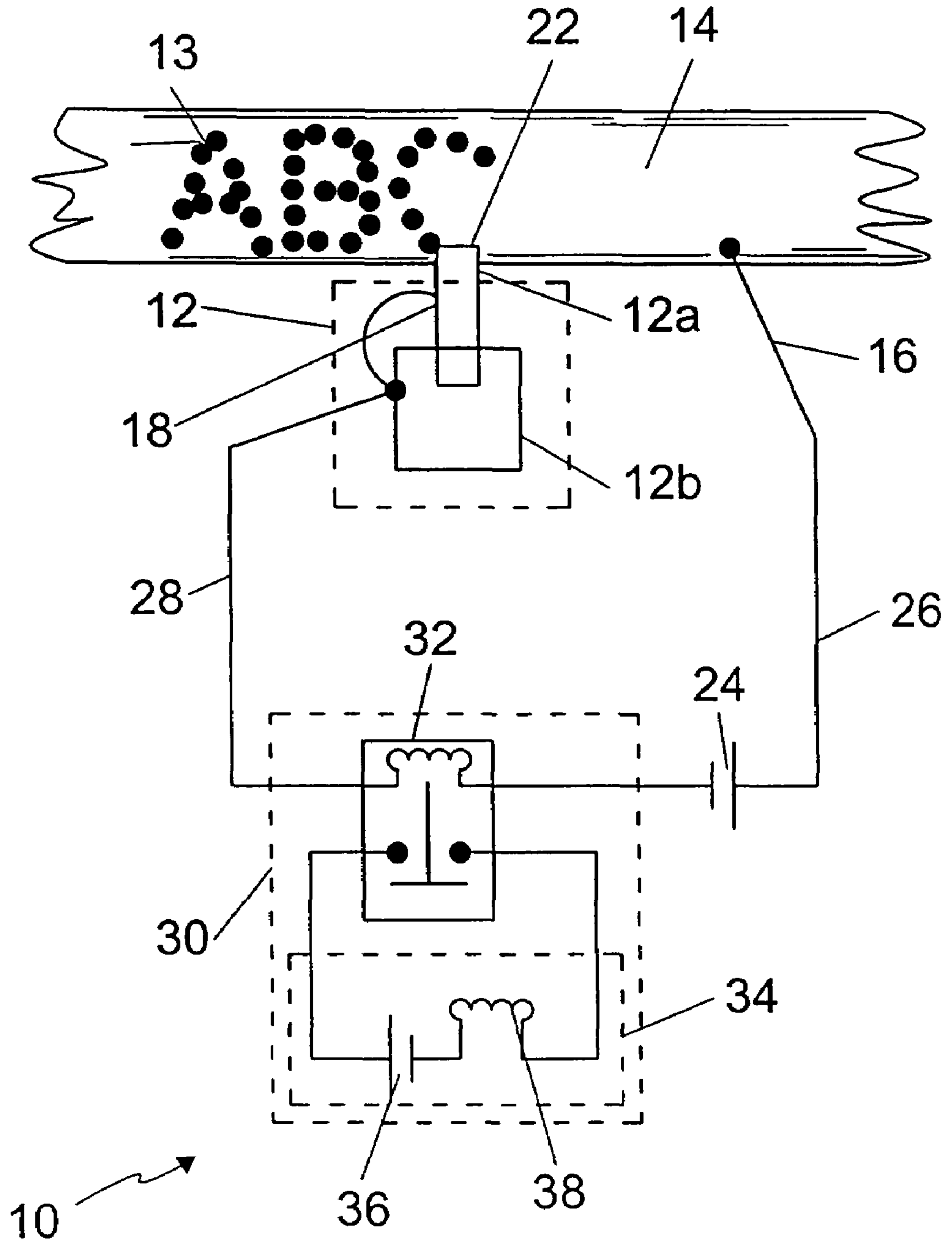
FIG. 1 is an electrical schematic for a positive piece engagement indicator for use with a pin stamping pin impact marking tool according to the preferred embodiment of the present invention.

Referring now to FIG. 1, a positive piece engagement indicator 10 for use with a pin stamping pin impact marking tool 12 is shown. The pin stamping pin impact marking tool 12 is utilized as a means to imprint identifying indicia 13 within a metal piece 14. The pin stamping pin impact marking tool 12 includes an impact pin 12*a* thrusted into the work surface by a pin driver 12*b*. A metal workpiece 14, having an electrically conductive surface, is contacted with a workpiece contact probe 16. Because the workpiece may be at a varying potential due to signal noise from other equipment, or due to its physical positioning on a chain or conveyor, the contact probe 16 provides physical contact with, as well as electrical communication with the metal surface of a workpiece 14 for purposes of providing an isolated, reliable electrical circuit. The marking tool 12 provided is in physical contacted with a marking tool contact 18 for providing physical contact with the marking tool, as well as electrical communication with the engagement surface 22 of the impact pin 12*a*. A test voltage means 24, anticipated as a 24 volt direct current source, provides electrical potential between the workpiece continuity probe 16 and the marking tool contact 18 though electrical communication between a first conducting means 26 and a second conducting means 28, respectively. An indicator means 30 is placed in series between the marking tool contact 18 and test voltage means 24 in series within the second conducting means 28.

In greater detail of the indicator means 30, upon physical contact of the engagement surface 22 with the surface of the metal workpiece 14, a circuit is completed by the electrical communication there between, thereby engaging the indicator means 30. Due to the speed at which the impact pin 12*a* is thrusted and returned by the pin driver 12*b*, actual physical engagement with the metal work surface occurs only for a limited time. Therefore, a latching relay 32 capable of sensing continuity for a short time duration is used to engage an indicator circuit or computer monitoring system 34. Due to this limited sensing duration, it is felt that the latching relay 32 should be capable of identifying and holding a continuity period of about least 1 milliseconds, and in development of the present invention the use of a latching chip, Texas Instruments CD4044BE or equal has been found to be sufficient. The computer monitoring system 34 is to provide a source of indicator power 36, as well as an indicator means 38 to allow for automation based upon the verification of the presence or absence of tool to piece engagement during the printing cycle.

This allows positive verification of actual engagement of worktool to workpiece.

Figure 2:
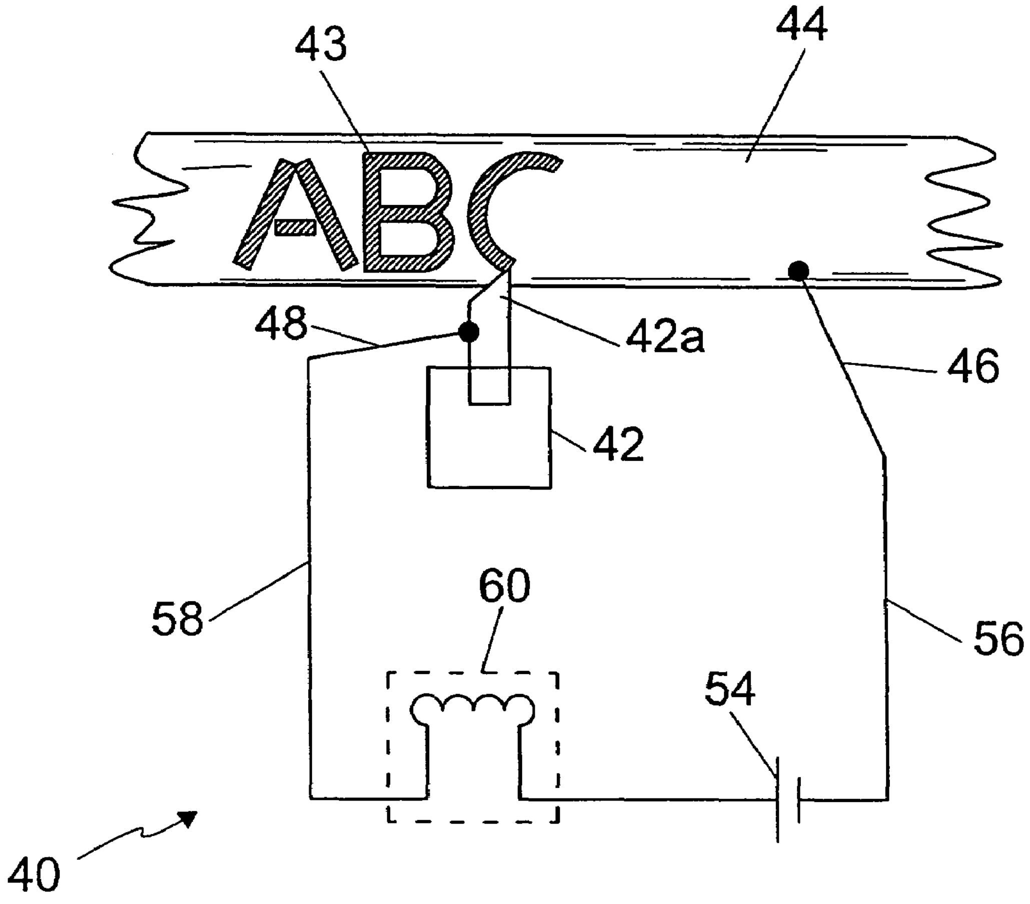
FIG. 2 is an electrical schematic for a positive piece engagement indicator for use with a scriber type marking tool according to an alternate embodiment of the present invention.

Referring now to FIG. 2, a positive piece engagement indicator 40 for use with a scriber type marking tool 42 is utilized as a means to etch identifying indicia 43 within a metal piece. The scriber type marking tool 42 includes a scriber tool having a scribing tip 42*a* which is scraped into the work surface 44. A metal workpiece 44, having an electrically conductive surface, is contacted with a workpiece contact probe 46. The contact probe 46 provides physical contact with, as well as electrical communication with the metal surface of a workpiece 44. The scribing tip 42*a* is in physical contacted with a marking tool contact 48 for providing physical contact with the marking tool. A test voltage means 54 anticipated as a 24 volt direct current source, provides electrical potential between the workpiece continuity probe 46 and the marking tool contact 48 though electrical communication between a first conducting means 56 and a second conducting means 58, respectively. An indicator means 60 is placed in series between the marking tool contact 48 and test voltage means 54 in series within the second conducting means 58.

In is anticipated that the indicator means 60 is initiated upon physical contact of the engagement surface 42*a* with the surface of the metal workpiece 44. Further, it is anticipated that the indicator means 60 is to provide a source of indicator power, as well as an indicator to allow for automation based upon the verification of the presence or absence of tool to piece engagement during the scribing cycle.

This allows positive verification of actual engagement of worktool to workpiece.

2. Operation of the Best Modes of the Present Invention

Figure 3:
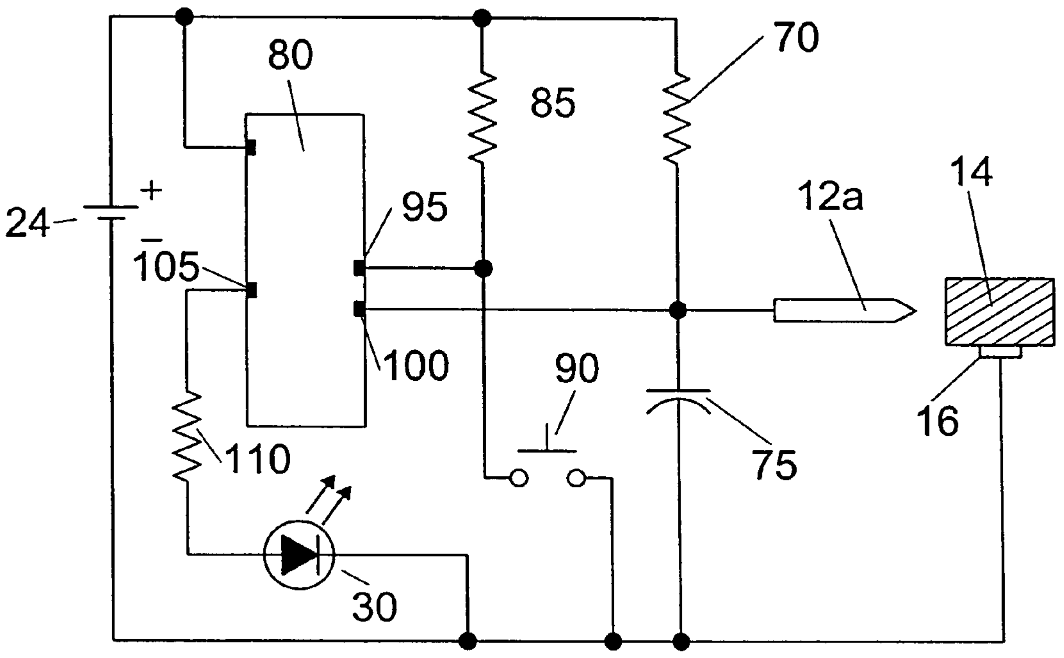
FIG. 3 is an electrical schematic for a positive piece engagement indicator for use with a pin stamping pin impact marking tool according to the currently envisioned best mode of the present invention.

Referring now to FIG. 3, an electrical schematic for a positive piece engagement indicator for use with a pin stamping pin impact marking tool according to the currently envisioned best mode of the present invention is disclosed. The power source for the schematic is the test voltage means 24, in this case shown as a battery, although any type of power supply capable of supplying a differential voltage could be used, as can be seen by those familiar in the art. The metal piece 14 is referenced to one potential of the test voltage means 24 by the workpiece contact probe 16 as aforementioned described in FIG. 1. The completion of the series circuit is provided by the engagement of the impact pin 12*a* as aforementioned described in FIG. 1. A first pull-up resistor 70 is included in a circuit that prevents the inputs to a latching circuit 80 from floating. A first damping capacitor 75 included in this circuit provides a damping effect that slows and filters the circuit. A second pull-up resistor 85 provides the same function to the opposing input on the latching circuit 80. A reset switch 90 is used to reset the circuit after engagement of the impact pin 12*a*. The latching circuit 80, envisioned to a CD4043B CMOS Quad 3-State R/S Latches in a 16 pin package or equal, has four latches in a common package of which one is used in this application. Each latch has a separate output and individual reset and set inputs, represented by a first input 95 and a second input 100, respectively.

In this application, provided that the first input 95 maintains a voltage reference as provided by positive engagement of the impact pin 12*a* with the metal piece 14 that is not lost for more than 45 nanoseconds, the output 105 will engage and energize the indicator means 30, in this case envisioned to be a light-emitting diode (L.E.D.), which is provided the correct current by a first dropping resistor 110. Once this engagement is made, the circuit remains engaged until reset by the reset switch 90 which applies a signal to the second input 100. The reset switch 90 can only be activated after the impact pin 12*a* has lost electrical contact with the metal piece 14.

Figure 4:
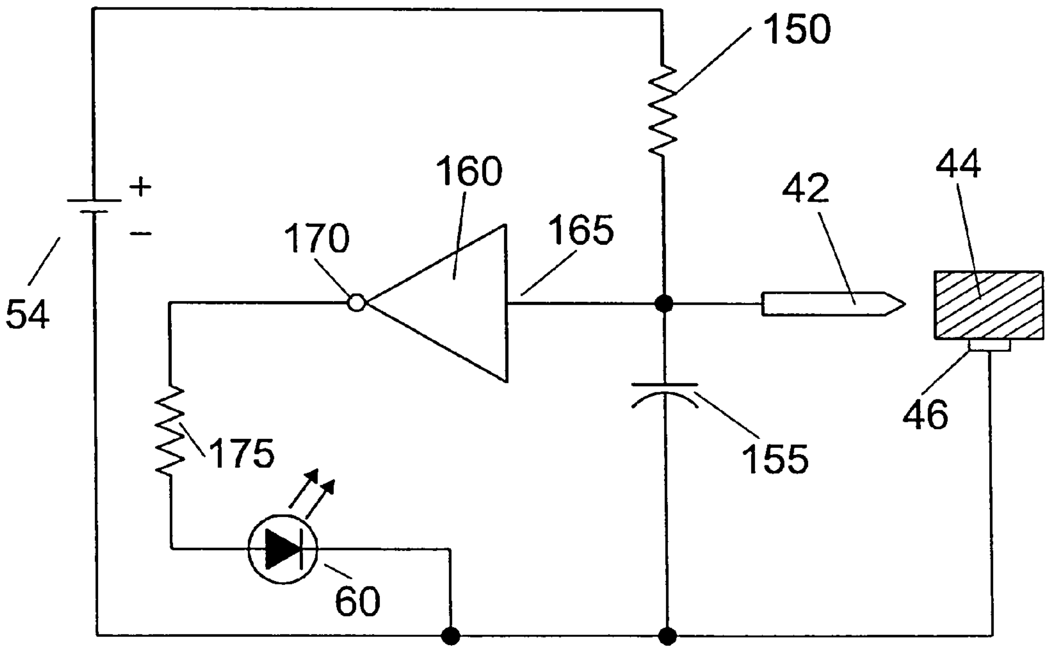
FIG. 4 is an electrical schematic for a positive piece engagement indicator for use with a scriber type marking tool according to the currently envisioned best mode of the present invention.

Finally in FIG. 4, an electrical schematic for a positive piece engagement indicator for use with a scriber type marking tool according to the currently envisioned best mode of the present invention is described. The power source for the schematic is the test voltage means 54, in this case shown as a battery, although any type of power supply capable of supplying a differential voltage could be used, as can be seen by those familiar in the art. The work surface 44 is referenced to one potential of the test voltage means 54 by the workpiece contact probe 46 as aforementioned described in FIG. 2. The completion of the series circuit is provided by the engagement of the scriber type marking tool 42 as aforementioned described in FIG. 2. A pull-up resistor 150 and a filtering capacitor 155 form a filter circuit that provides an clean signal to an inverting circuit 160. The inverting circuit 160, envisioned to a CD4049YB Hex Inverting Buffer in a 16 pin package, has six inverting buffers with high current output capability suitable for driving TTL or high capacitive loads. One of these inverters is used in this application. In this application, provided that a primary input 165 maintains a voltage reference as provided by positive engagement of the scriber type marking tool 42 with the work surface 44 for 65 nanoseconds, a primary output 170 will become energized and power the indicator means 60, in this case envisioned to be a light-emitting diode (L.E.D.), which is provided the correct current by a second dropping resistor 175. In the event of a nonengagement of the scriber type marking tool 42 for a period longer than 30 consecutive nanoseconds, the primary output 170 will be de-energized.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A positive piece engagement indicator for use with a pin stamping pin impact marking tool comprising:

an impact pin for marking a metal piece;

test voltage means capable of supplying a differential voltage;

workpiece contact probe referenced to one potential of said test voltage means;

the impact pin forming the completion of a series circuit with said test voltage means, a pull-up circuit formed of a primary pull-up resistor and a filtering capacitor for providing a filtered, uninterrupted signal to a latching circuit; and a second resistor providing an opposing input to said latching circuit referenced to the same electrical potential as the metal piece.

2. The positive piece engagement indicator for use with a pin stamping pin impact marking tool of claim 1, further comprising:

reset means to reset the circuit after engagement of the impact pin has been detected.

3. The positive piece engagement indicator for use with a pin stamping pin impact marking tool of claim 1, wherein said latching circuit includes a CD4044BU Quad NAND R/S Latch in a 16 pin package having four circuits of "D" type latches having common CLOCK input and POLARITY input.

4. The positive piece engagement indicator for use with a pin stamping pin impact marking tool of claim 3, wherein after engagement of the impact pin for a period longer than 20 milliseconds, an output will be energized and remain so until reset by a reset switch which applies a signal to the second input.

* * * * *